United States Patent
Nenov (10) Patent No.: US 11,314,540 B2
(45) Date of Patent: *Apr. 26, 2022

(54) COMBINED NETWORK AND PHYSICAL SECURITY APPLIANCE

(71) Applicant: Fortress Cyber Security, LLC, Orlando, FL (US)

(72) Inventor: Dejan Nenov, Boise, ID (US)

(73) Assignee: Fortress Cyber Security, LLC, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,636

(22) Filed: Jun. 24, 2019

(65) Prior Publication Data

US 2019/0310876 A1     Oct. 10, 2019

Related U.S. Application Data

(63) Continuation of application No. 15/688,091, filed on Aug. 28, 2017, now Pat. No. 10,331,473, which is a (Continued)

(51) Int. Cl.
*G06F 9/455* (2018.01)
*H04L 29/06* (2006.01)
(Continued)

(52) U.S. Cl.
CPC ...... *G06F 9/45558* (2013.01); *G06F 9/45533* (2013.01); *G08B 5/36* (2013.01);
(Continued)

(58) Field of Classification Search
CPC ............. G06F 9/45558; G06F 9/45533; G06F 2009/45595; G06F 2009/45587; H04W 12/1206; H04W 4/70; H04W 12/126; H04W 12/122; G08B 5/36; G08B 13/08; G08B 25/08; H04L 12/2803;
(Continued)

(56) References Cited

U.S. PATENT DOCUMENTS 7,295,112 B2    11/2007   Bowser et al.
7,895,649 B1 *   2/2011   Brook .................. H04L 43/026
                                                       709/224
(Continued)

OTHER PUBLICATIONS

Notice of Allowance on U.S. Appl. No. 15/688,091 dated Feb. 6, 2019.
(Continued)

*Primary Examiner* — Matthew Smithers
(74) *Attorney, Agent, or Firm* — Foley & Lardner LLP (57) ABSTRACT

The present disclosure describes a combined network and physical security appliance. The appliance may be wired to or communicate with automation systems, IoT devices, physical sensors, computing devices and servers on an internal or local network, and other computing devices on an external network. By combining network security and physical security into a single device, a combination security appliance may correlate physical sensor signals with packet inspection results, providing enhanced protection against network threats to physical security systems, and physical protection against network threats.

20 Claims, 7 Drawing Sheets

Related U.S. Application Data continuation of application No. 15/299,004, filed on Oct. 20, 2016, now Pat. No. 9,781,603.

(51) Int. Cl.
*G08B 5/36* (2006.01)
*G08B 13/08* (2006.01)
*G08B 25/08* (2006.01)
*H04L 12/28* (2006.01)
*H04W 12/126* (2021.01)
*H04L 67/12* (2022.01)
*H04W 4/70* (2018.01)

(52) U.S. Cl.
CPC .............. *G08B 13/08* (2013.01); *G08B 25/08* (2013.01); *H04L 12/2803* (2013.01); *H04L 63/0853* (2013.01); *H04W 12/126* (2021.01); *G06F 2009/45587* (2013.01); *G06F 2009/45595* (2013.01); *H04L 63/0263* (2013.01); *H04L 63/1425* (2013.01); *H04L 67/12* (2013.01); *H04W 4/70* (2018.02)

(58) Field of Classification Search
CPC .............. H04L 63/0853; H04L 63/0263; H04L 63/1425; H04L 67/12
See application file for complete search history.

(56) References Cited

U.S. PATENT DOCUMENTS

| | | | | |
|---|---|---|---|---|
| 8,068,986 | B1* | 11/2011 | Shahbazi | H04L 63/126 342/28 |
| 9,271,170 | B1 | 2/2016 | Loverich et al. | |
| 9,473,514 | B1 | 10/2016 | Chou et al. | |
| 9,692,784 | B1* | 6/2017 | Nenov | H04L 63/1458 |
| 9,781,603 | B1* | 10/2017 | Nenov | G08B 5/36 |
| 9,922,512 | B2* | 3/2018 | Giri | H04L 67/12 |
| 9,978,237 | B2* | 5/2018 | Britt | G08B 19/00 |
| 10,331,473 | B2* | 6/2019 | Nenov | G06F 9/45558 |
| 2005/0060562 | A1* | 3/2005 | Bhattacharya | H04L 63/1416 726/26 |
| 2005/0086523 | A1* | 4/2005 | Zimmer | G06F 21/554 726/4 |
| 2006/0200253 | A1 | 9/2006 | Hoffberg et al. | |
| 2008/0209505 | A1* | 8/2008 | Ghai | H04L 63/20 726/1 |
| 2008/0219239 | A1* | 9/2008 | Bell | H04L 12/4625 370/351 |
| 2009/0070571 | A1* | 3/2009 | Neely | G07C 9/32 713/1 |
| 2011/0187488 | A1* | 8/2011 | Fiske | G08B 5/36 340/3.1 |
| 2012/0203508 | A1* | 8/2012 | Hamzaoui | G06F 21/55 702/183 |
| 2012/0314063 | A1* | 12/2012 | Cirker | G08B 13/19697 348/143 |
| 2014/0331274 | A1* | 11/2014 | Bitton | H04L 63/1408 726/1 |
| 2015/0128274 | A1 | 5/2015 | Giokas | |
| 2015/0150118 | A1 | 5/2015 | Addepalli et al. | |
| 2015/0244828 | A1 | 8/2015 | Heydon | |
| 2016/0352759 | A1* | 12/2016 | Zhai | G06N 20/00 |
| 2017/0004692 | A1 | 1/2017 | Britt et al. | |
| 2017/0012940 | A1 | 1/2017 | Chang et al. | |
| 2018/0034837 | A1 | 2/2018 | Lakhani et al. | |
| 2018/0041529 | A1* | 2/2018 | Mixer | H04W 12/1202 |

OTHER PUBLICATIONS

Tozlu et al., "Wi-Fi Enabled Sensors for Internet of Things: A Practical Approach", IEEE Communications Magazine, Jun. 2012, pp. 134-143.

U.S. Notice of Allowance for U.S. Appl. No. 15/299,004 dated Jun. 28, 2017 (9 pages).

U.S. Office Action for U.S. Appl. No. 15/299,004 dated Jan. 26, 2017 (12 pages).

U.S. Office Action on U.S. Appl. No. 15/688,091 dated May 17, 2018.

* cited by examiner

COMBINED NETWORK AND PHYSICAL SECURITY APPLIANCE

RELATED APPLICATIONS

This application claims the benefit of and priority as a continuation of U.S. Nonprovisional application Ser. No. 15/688,091, entitled "Combined Network and Physical Security Appliance," filed Oct. 28, 2017; which is a continuation of U.S. Nonprovisional application Ser. No. 15/299,004, entitled "Combined Network and Physical Security Appliance," filed Oct. 20, 2016, the entirety of each of which is hereby incorporated by reference.

BACKGROUND

Physical security devices, such as those used in home security systems, typically focus on physical threats, such as intrusions via windows and doors. As buildings become wired with "intelligent" systems, such as home automation, wireless access, and "Internet of Things" (IoT) devices and appliances, communications networks may become vectors for physical intrusion. Conversely, network security systems that lack physical security are inherently vulnerable to attack by anyone with physical access.

SUMMARY

The present disclosure describes a combined network and physical security appliance. The appliance may be wired to or communicate with automation systems, IoT devices, physical sensors, computing devices and servers on an internal or local network, and other computing devices on an external network. By combining network security and physical security into a single device, a combination security appliance may correlate physical sensor signals with packet inspection results, providing enhanced protection against network threats to physical security systems, and physical protection against network threats.

BRIEF DESCRIPTION OF THE FIGURES

In the drawings, like reference numbers generally indicate identical, functionally similar, and/or structurally similar elements.

DETAILED DESCRIPTION

The following description in conjunction with the above-referenced drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

Physical security devices, such as those used in home security systems, typically focus on physical threats, such as intrusions via windows and doors. Security devices may include physical sensors, such as magnetic switches, optical sensors and sources, physical switches or latches, motion or temperature sensing cameras or sensors, optical cameras, vibration sensors, or other such devices. For example, a magnet may be mounted to a door and a magnetic switch may be installed on a corresponding portion of a door jamb, or a camera may be installed and aimed towards a potential entry or exit point. The various security devices may be connected to a computing device via various communications systems. For example, switches may be wired to GPI/O inputs, temperature sensors may be connected via serial data, analog cameras may be connected via coaxial cable, digital cameras or cameras with A/D converters and codecs may be connected via Ethernet or WiFi, etc. The computing device may also communicate with other devices outside of the environment, such as a security provider, a portable device of a user or resident (e.g. smart phone or other computing device), an emergency service provider, etc. Such communications may be via a network such as the Internet or cellular network. Accordingly, the computing device may potentially be vulnerable to network security threats. For example, an intruder may execute a denial of service attack on the computing device via the external network to consume processing resources and prevent the computing device from detecting a physical sensor trigger and transmitting an alert. In another example, an intruder may provide wireless network interference or noise to prevent a WiFi-based camera or motion sensor from communicating with the computing device, preventing it from detecting and responding to a signal.

Similarly, many buildings are now being wired with "intelligent" systems, such as home automation systems including automated doors that unlock when a resident carrying a portable communication device approaches. The proximity of the device may be detected via near field communications (NFC), Bluetooth, 802.11 WiFi, radiofrequency (RF) signaling, geolocation and geofence-based triggers, or any other type and form of signaling system. The door latch may communicate with a computing device, such as a security device, via WiFi, Ethernet, or any other type and form of communication system. As discussed above, the door latch may be similarly vulnerable to network based threats that prevent successful communication with the security device and/or with computing devices on an external network. Other such automation systems may include IoT devices or appliances including intelligent thermostats, refrigerators, lighting systems, smart televisions, voice-activated smart assistant devices, or other such computing devices. The devices may be wired to physical systems, such as doors, windows, lights, heating or air conditioning systems, plumbing systems, garage doors, gates, or other such systems. The devices may be vulnerable to network-based attacks, which may result in disruption to physical systems or potential physical intrusions.

Conversely, network security systems that lack physical security are inherently vulnerable to attack by anyone with physical access. A firewall or gateway between an external network and local network may be turned off, rebooted, and/or reset to factory default settings by a malicious actor with physical access to the device. Similarly, the network security system may be more vulnerable to malicious communications from inside the network, as many filtering rules are directed towards preventing external hacking attempts. For example, many network appliances provide administrator access to computing devices on a local area network by default or with a common, predetermined and rarely changed password, but may prevent external administrator access via a wide area network by default. If a security device, such as a WiFi-based camera connected to the internal network, is vulnerable to attack, a malicious actor may use the camera as a vector to gain access to the network security system.

Previously, physical security systems and network security systems have been separated via different networks and/or communications protocols, different wiring or connection standards, or other such distinctions. As physical security systems become networked, they may have various vulnerabilities as discussed above. Similarly, if physical security systems and network security systems are integrated in a naïve or mutually agnostic way (e.g. by simply connecting a physical security computing device to an internal network, without additional functionality or integration), the physical security systems may unintentionally become vectors for attack on the network.

The present disclosure describes a combined network and physical security appliance or device. The combination device may be wired to or communicate with automation systems, IoT devices, physical sensors, computing devices and servers on an internal or local network, and other computing devices on an external network. By combining network security and physical security into a single device, a combination security device may correlate physical sensor signals with packet inspection results, providing enhanced protection against network threats to physical security systems, and physical protection against network threats.

For example, a combination security device may receive and forward packets directed to an automated door latch system, and may similarly receive signals from a physical sensor connected to the door (e.g. magnetic switch, etc.). The security device may expect the signals to be correlated in many implementations. For example, if a user transmits a request to unlock the door via a portable communication device, such as a smart phone, the security appliance may receive and forward the request to the door latch system, and may expect to detect a signal from the physical sensor within a short time period. If the physical sensor signal is not received, then the request may be identified as an attack attempt and further requests filtered or blocked, logged, or otherwise processed. Similarly, if the security device detects a physical sensor signal without a corresponding expected network packet (e.g. a request to unlock the door), the security device may identify a physical intrusion.

Figure 1A:
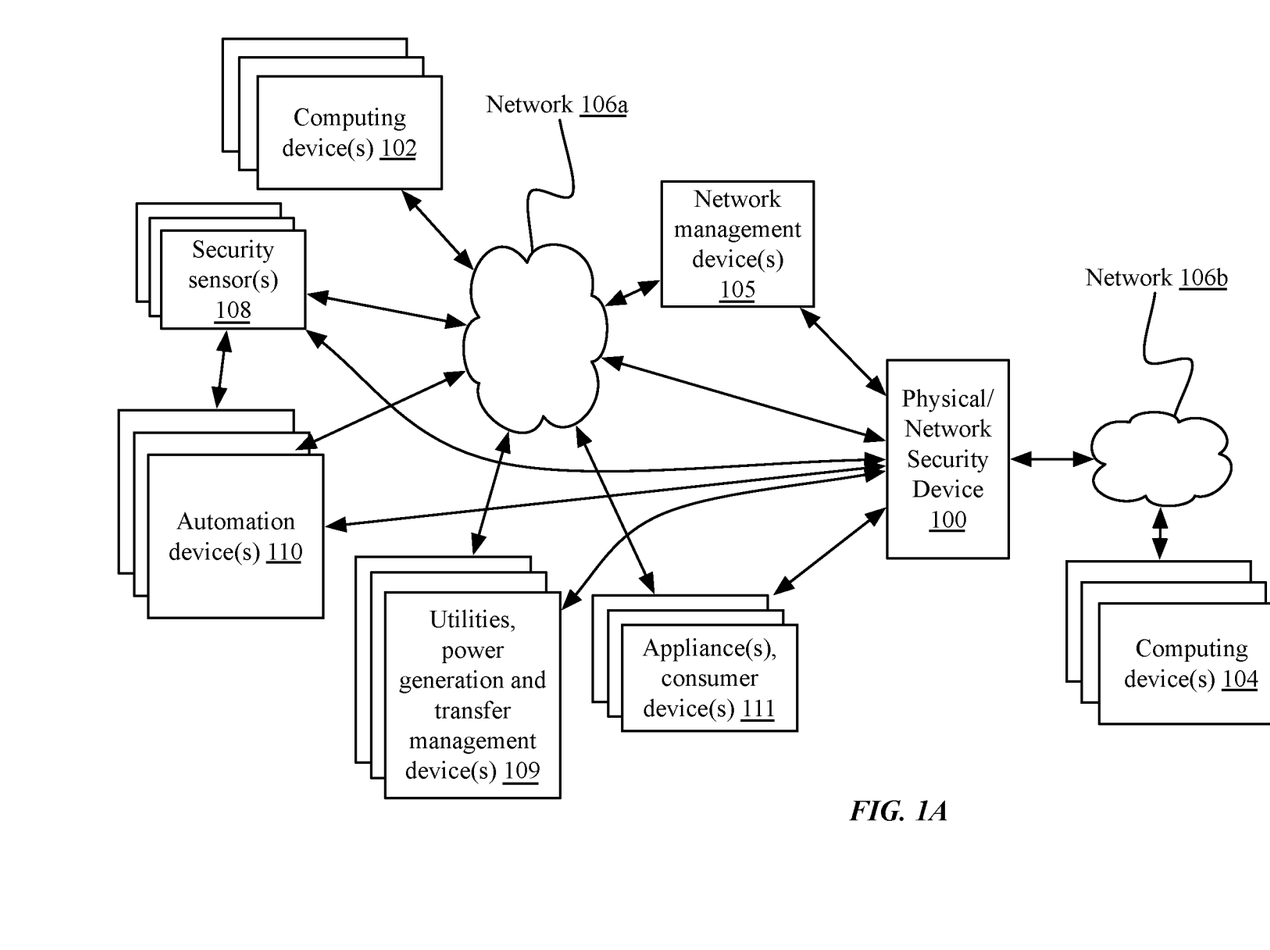
FIG. 1A is a block diagram of an embodiment of a computing environment for providing physical and network security.

For example, referring first to FIG. 1A, illustrated is a computing environment comprising a combination physical and network security device 100 deployed as an intermediary between a first one or more computing devices 102a-102c (referred to generally as client devices, clients, local or internal devices, server devices, servers, host devices, hosts, or computing devices 102), and a second one or more computing devices 104a-104c (referred to generally as client devices, clients, server devices, servers, external devices, host devices, hosts, or computing devices 104), via a plurality of network segments 106a-106b (referred to generally as network segments or networks 106). Security device 100 may also communicate either via a network 106a or directly via a sensor interface with one or more security sensors 108 (referred to generally as physical sensors, security sensors, physical security devices, or by similar terms); and/or with one or more automation devices 110 (referred to generally as home automation devices, automation systems, intelligent devices or appliances, IoT devices, user interaction devices, or any other such name). Although frequently referred to as home automation devices 110, such devices may be used in businesses or other environments. Security device 100 may also communicate with one or more "smart" or network-connected appliances or consumer devices 111, such as smart refrigerators, ovens, sous vide circulators, air conditioners, or other such machines or devices, wearable devices such as workout monitors, health monitors, or other such devices, or any other device not considered an automation device 110. In some implementations, security device 100 may communicate directly with appliances or consumer devices 111, e.g. via Bluetooth, serial connections, etc., while in other implementations, security device 100 may communicate with appliances or consumer devices 111 via a network 106a. Security device 100 may also communicate to one or more utilities, power generation, and/or transfer management devices 109 (e.g. solar installation power managers, inverter controllers such as any of the controllers or managers manufactured by SunPower Corporation of San Jose, Calif.; wireless power transfer devices, such as the WattUp transmitters manufactured by Energous Corporation of San Jose, Calif.; the PowerWall home battery or Power-Pack storage system, manufactured by Tesla Motors, Inc. of Palo Alto, Calif.; or any other such devices), via a network 106a or directly (e.g. via BlueTooth, serial, power line communications, WiFi, or any other such system).

In some implementations, network 106a may be provided by a security device 100, such as via a built-in network switch, WiFi access point, etc. In other implementations, one or more network management devices 105 may be connected to a security device 100 and provide network 106a. For example, a network management device 105, such as a router, gateway, WiFi access point, or other such device, may be an intermediary between security device 100 and network 106a, and may provide functionality for network 106a and communications to one or more computing devices, security sensors automation devices, and/or appliances or consumer devices. Accordingly, in some implementations, communications to networked devices from security device 100 may flow through network management devices 105. Security device 100 may accordingly also provide security for network management devices 105 (e.g. protection from unauthorized access to configuration or control functions, etc.).

Combined physical and network security device (referred to generally as a combination device, combination appliance, physical/network security appliance, or by similar terms) may comprise a gateway, firewall, switch, hub, access point, modem, or any other such device. Although shown intermediary to networks 106a-106b, in some implementations, combination device 100 may be deployed as a side-chain device. Networks 106 may comprise any type and form of network, including a local area network (LAN), wide area network (WAN) such as the Internet, a wireless network, a cellular network, a satellite network, a cable network, or any combination of these or other networks. Additional devices not illustrated may be deployed on networks 106, including switches, gateways, routers, firewalls, or other such devices. Computing devices 102, 104 may comprise any type and form of computing device, including desktop computers, laptop computers, tablet computers, smart phones, smart televisions, game consoles, wearable computers, networked devices or appliances such as IoT devices, server computers, workstations, or any other type and form of networked computing device, and may be variously referred to as servers, clients, hosts, remote devices, local devices, or by any other such name.

Combination device 100 may receive packets from computing devices 102, 104, 108, and/or 110, and directed to other computing devices 102, 104, 108, and/or 110 (or vice versa). Depending on security and filtering rules, combination device 100 may forward or retransmit the packet; block or discard the packet; or modify and retransmit the packet (e.g. with network address translation (NAT), payload stripping or encryption to prevent information exfiltration, etc.). Packet processing or security rules may be quite complex, based on a combination of information from one or more layers of the packet, including internet or network layer addresses, transport layer addresses, session or application layer protocols, payload information, other header information such as quality of service (QoS) requirements or priority, or any other type and form of information.

Figure 1B:
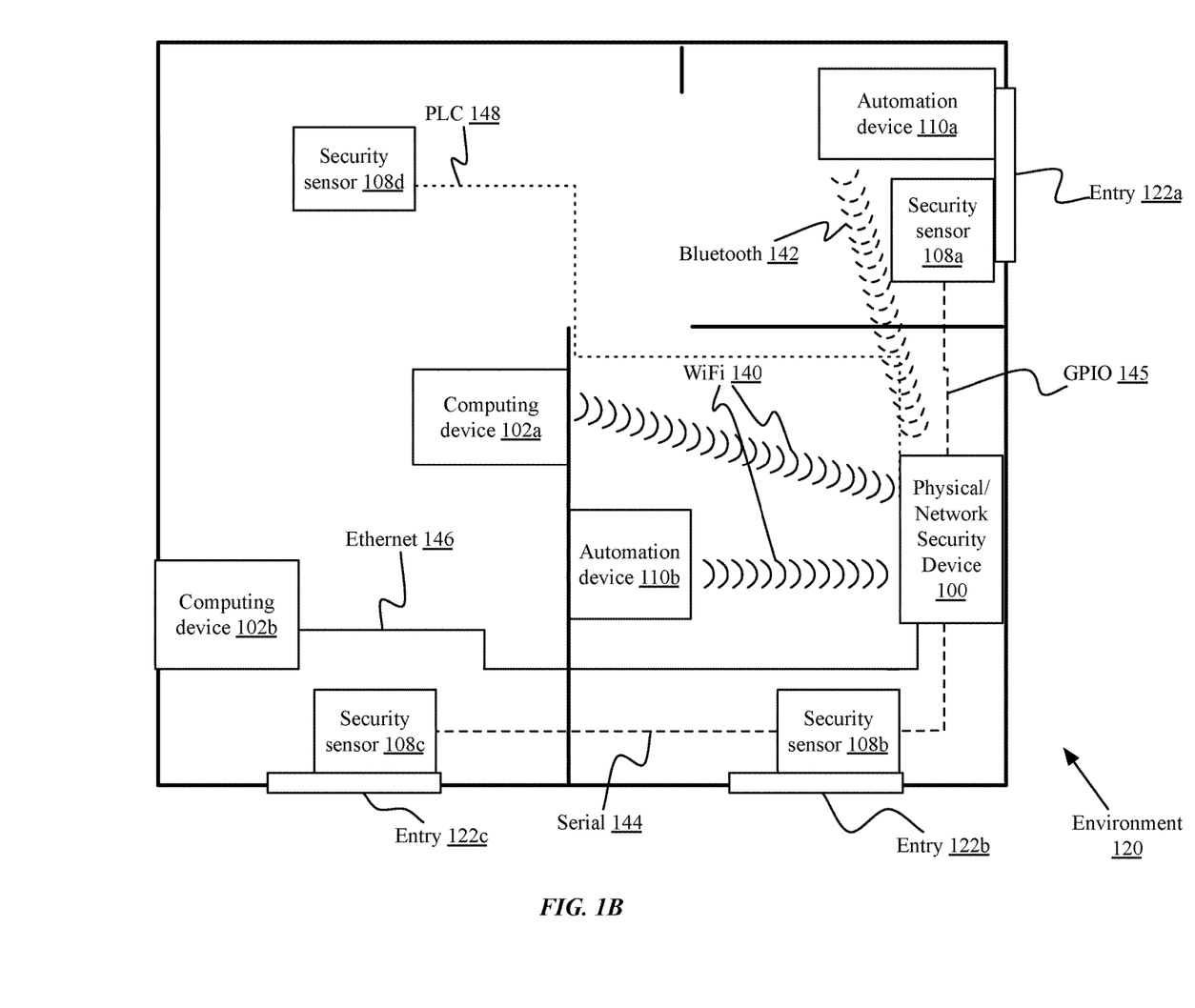
FIG. 1B is a plan illustration of an embodiment of a physical environment for providing physical and network security.

FIG. 1B is a plan illustration of an embodiment of a physical environment for providing physical and network security. The physical environment 120 may include one or more physical entry points 122a-122c (referred to generally as entry or entries 122), such as doors or windows. Entry points 122 may frequently be associated with one or more security sensors 108a-108c as shown, such as magnetic or vibration sensors as discussed above, or any other type and form of sensor. Other security sensors 108d may be installed in the environment 120, such as cameras, temperature sensors, infrared sensors, motion sensors, optical sensors, or other security sensors as discussed above. The environment 120 may also include one or more automation devices 110a-110b, such as automatic door latches, lighting controls, HVAC controls, etc., as discussed above. In many implementations, the environment 120 may also include one or more computing devices 102a-102b.

The environment 120 may include a physical/network security device 100, which may communicate via one or more local devices 102, 106, 108, 110 via a network 104 (not illustrated) or direct connections. For example, in some implementations, the combination device 100 may communicate via an 802.11 or WiFi connection with devices, such as a computing device 102a and an automation device 110b as shown. The combination device 100 may also communicate with devices, such as an automation device 110a as shown, via a Bluetooth communication protocol or other protocol (e.g. NFC, Wireless Universal Serial Bus (USB), or any other such communication interface). The combination device 100 may also communicate with devices via a serial communication interface 144, such as security sensors 108b-108c as shown. The combination device 100 may also communicate with devices via a general purpose input/output (GPIO) interface 145 such as an input voltage or current sensor, and/or output voltages or contact closures, such as a security sensor 108a as shown. The combination device 100 may also communicate with devices via an Ethernet interface 146, such as computing device 102b as shown. The combination device 100 may also communicate with devices via any other type and form of communication protocol or interface, such as a power-line communication 148 with security sensor 108d, as shown. Communications may be unidirectional (e.g. for a GPIO contact closure) or bidirectional (e.g. for an Ethernet, WiFi, or Bluetooth connection). Although many varieties of communication protocol are shown in environment 120, in many implementations, the combination device 100 may communicate with other devices via only one or two protocols or interfaces, such as WiFi and serial data, or WiFi and a GPIO interface. Additionally, in other implementations, other communications interfaces or protocols may be used, including fiber optic, cellular, satellite, optical, surface acoustic wave, or other.

Figure 2A:
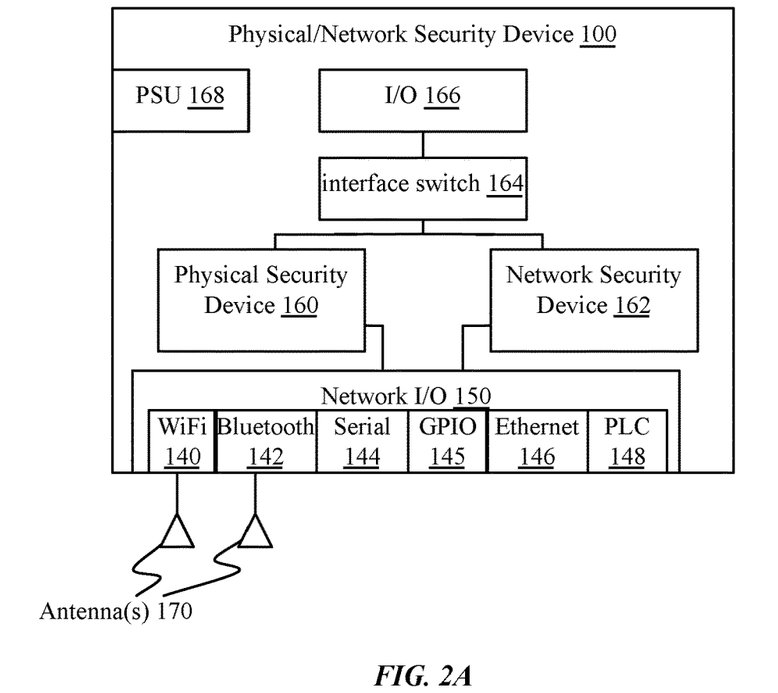
FIGS. 2A-2C are block diagrams of embodiments of a combination physical and network security device.

A combination physical and network security device may be integrated in any of several different methods. Referring first to FIG. 2A, illustrated is a first implementation of a combination device 100 including a separate physical security device 160 and network security device 162 within a single housing of a device or appliance. Physical security device 160 and network security device 162 may be independent and separate, such as two printed circuit boards (PCBs) with separate processors, memory, and bus interfaces deployed within the housing. For example, a combination device 100 may comprise a rackmount server or blade server with a backplane and separate cards or PCBs for a physical security device 160 and network security device 162. In another implementation, the combination device 100 may comprise an enclosure with room for two PCBs, one for each of physical security device 160 and network security device 162. Such implementations may allow for easy integration of already-existent physical security devices 160 and network security devices 162.

In many implementations as shown, physical security device 160 and network security device 162 may share a common power supply unit or units 168 (e.g. two power supplies for redundancy and high availability). Physical security device 160 and network security device 162 may similarly communicate via a backplane or common bus to an interface switch 164, which may selectively couple or switch an input/output interface or device 166 between the physical security device 160 and network security device 162. For example, in some implementations, the combination device 100 may include a display, multi-touch screen, keyboard, speaker, or other input and output devices 166. In some implementations, such as with a display or multi-touch screen, the input/output device 166 may be deployed on or in a surface of a housing of the device (e.g. along a face of the appliance). An interface switch 164 may comprise a keyboard-mouse-video (KVM) switch connected to each of physical security device 160 and network security device 162 and the input/output devices 166. The switch 164, physical security device 160 and network security device 162, and input/output devices 166 may communicate via any suitable protocol or interface, such as USB, HDMI, serial, Ethernet, or other such interface. In some implementations, switch 164 may comprise a physical switch, while in other implementations switch 164 may be controlled by software executed by each of physical security device 160 and network security device 162.

Physical security device 160 and network security device 162 may similarly communicate via a common network interface 150 to various physical interfaces (e.g. WiFi 140, Bluetooth 142, serial interfaces 144, GPIO inputs and outputs 145, Ethernet interfaces 146, power line communication interfaces 148, or any other type and form of interface). This may allow the devices 160, 162 to share interfaces 140-148 and antennas 170 or physical ports. In other implementations, each of physical security device 160 and network security device 162 may have its own network interfaces 150. For example, each PCB may include one or more Ethernet interfaces. In some implementations, a combination device 100 may comprise an Ethernet switch and internal connections to physical security device 160 and network security device 162, as well as external ports for connection to other devices on an internal network or LAN, and to an Internet or WAN (potentially via a modem, not illustrated). Similarly, a combination device 100 may comprise a switch and WiFi access point.

PSU 168 may comprise any type and form of power supply, such as a DC supply, AC-fed switch mode power supply, battery power, or any other type and form of power supply. Although shown internally, in many implementations, part or all of PSU 168 may be external to device 100. In many implementations, for reliability, combination device 100 may have multiple power supplies.

Figure 2B:
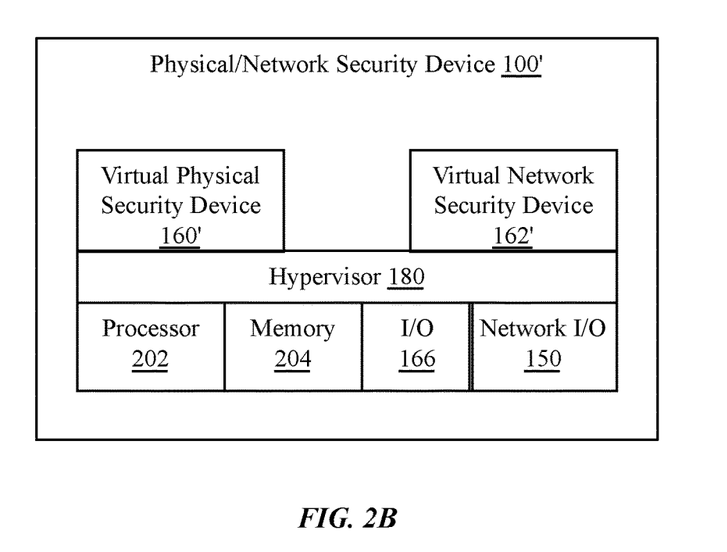

Referring briefly to FIG. 2B, in another implementation, a combination device 100' may comprise a hypervisor 180 and a virtual physical security device 160' and virtual network security device 162'. The hypervisor 180 may provide shared access to a common hardware layer, such as a processor 202 and memory 204, discussed in more detail below, input and output devices or interfaces 166, and/or network interfaces 150. Such implementations may reduce hardware costs, while providing a sandboxed or separate environment for each of virtual physical security device 160' and virtual network security device 162', preventing attacks between the devices 160', 162' via shared memory 204. Combination device 100' may also include one or more PSUs 168, not illustrated.

Figure 2C:
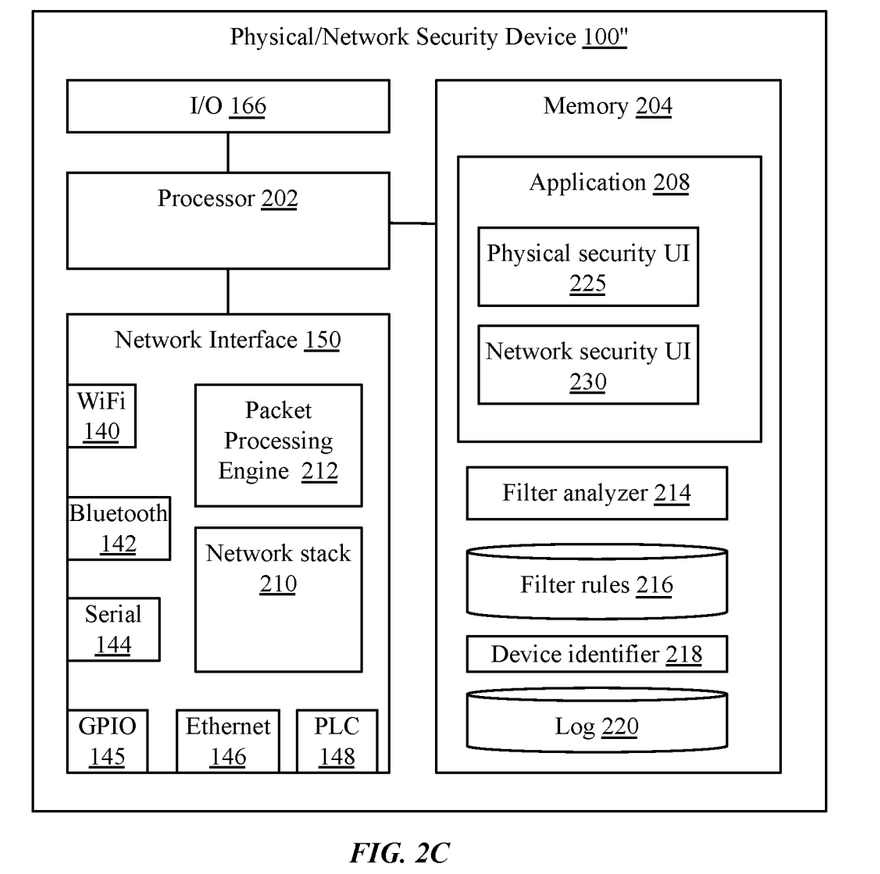

Referring to FIG. 2C, illustrated is another implementation of a combination physical/network security device 100". As shown, in some implementations, combination device 100" may store, in a memory device 204, an application 208. Application 208 may provide both network and physical security functionality, and may include both a physical security user interface 225 and a network security user interface 230, such as different control and monitoring screens or interfaces, web or application pages, or other services. Such implementations may be inexpensive and easily manufactured, and may potentially provide for more efficient integration between physical security and network security with less inter-process bandwidth required. This may reduce latency in many implementations.

In many implementations, security device 100" may include one or more power supplies 168 (not illustrated). Similarly, although not shown in FIGS. 2A and 2B for clarity, in many implementations, security devices 100, 100' may execute applications 208 providing physical security user interfaces 225 and network security user interfaces 230; and filter analyzers 214 discussed in more detail below. Security devices 100, 100' may similarly include a rules database 216, device identifier 218, and log 220, as well as a network stack 210 and packet processing engine 212, discussed in more detail below. Accordingly, these components may be included in any combination on any implementation of a combined security device, including a device 100 with separate internal devices, a device 100' with a hypervisor and virtual devices, or a device 100" with software devices or applications.

Security devices 100, 100', 100", referred to generally as security device(s) 100, may comprise a laptop computer, desktop computer, wearable computer, portable computer, smart phone, tablet computer, rack mount computer, blade server, appliance, or any other type and form of device. In some implementations, a security device 100 may not include all of elements 202-220 illustrated, or may include a plurality of any of elements 202-220 or other elements. For example, in one implementation, a security device 100 may comprise a plurality of network interfaces 150. Furthermore, although illustrated as a single device, in many implementations as discussed above, a security device 100 may comprise a plurality of security devices 100 in communication via a network, such as a separate switch and firewall, or any other combination of these or other devices. In some implementations, a security device 100 may comprise a virtual device or virtual machine, executed by a physical machine.

A security device 100 may include one or more processors 202. A processor 202 may comprise a central processing unit (CPU), microprocessor, application-specific instruction-set (ASIC) processor, or any other type and form of processor for receiving, analyzing, filtering, blocking, modifying, and/or retransmitting packets, and processing sensor signals and applying correlation rules. A processor 202 may communicate with one or more network interfaces 150, which may comprise any type and form of network interfaces, such as a physical interface (e.g. Ethernet, fiber optic interface, or any other such interface), a wireless interface (e.g. 802.11a, 802.11b, 802.11.g, 802.11n, 802.11ac, Bluetooth, cellular, or any other such interface), or a virtual or abstract interface (e.g. physical transport of storage, or "SneakerNet"), or any other such type and form of interface. Network interfaces 150 may be used for receiving and transmitting packets, as well as performing many types of data extraction and processing on the packets. Network interfaces 150 may communicate with computing devices 102, 104, sensors 108, and automation devices 110 via a network 106 (not illustrated), which may comprise any type and form of network or networks, including a LAN and/or WAN such as the Internet. For example, in many implementations, a security device 100 may connect to a first LAN, which may connect to the Internet, which may further connect to a second LAN connected to client devices. Accordingly, a network may comprise one or more of a physical network, an Ethernet network, a satellite network, a wireless network, a cellular network, or any other network or combination of networks, and may further comprise one or more devices including gateways, firewalls, network accelerators, proxies, switches, hubs, routers, WiFi access points, load balancers, or any other such devices.

Although a network interface may typically refer to computer networks or even packet-based networks, a network may also refer to serial or parallel connections to sensors, relays, motors, or other security devices. Accordingly, as shown, in many implementations network interface 150 may also refer to serial connections 144 and GPIO connections 145, as well as WiFi interfaces 140, Bluetooth interfaces 142, Ethernet interfaces 146, power line communications interfaces 148, or other interfaces not illustrated. In other implementations, some or all of these features may be provided separately from network interface 150. For example, a security device 100 may comprise a GPIO PCB with a plurality of relays and voltage sensors connected via a bus (e.g. PCI bus, or any other type of interface) to processor 202. Accordingly, some features may be separate from network interface 150.

A network interface may include a network stack 210, which may comprise processing and functionality for a plurality of layers of the stack, including a physical layer, network layer, transport layer, session layer, presentation layer, application layer, or any other such layers. The network stack 210 may comprise routines for encapsulating and de-encapsulating headers and payloads of packets at various layers, and may provide functionality for one or more protocols at any layer of the network stack.

A security device 100 may execute a packet processing engine 212, which may be part of the network interface 150 or network stack 210, or may be executed separately by a processor 202. A packet processing engine 212 may comprise an application, service, server, daemon, routine, or other executable logic for processing packets, including performing network address translation, encryption, decryption, compression, decompression, modification of headers or payloads, buffering, caching, pooling, multiplexing, fragmentation or defragmentation, error correction, retransmission handling such as for a lossless protocol, or any other type and form of processing. In some implementations, packet processing engine 212 may extract data or identifiers from a packet for analysis and filtering, such as extracting IP addresses or ports, protocol types, QoS parameters, payload sizes, sequence numbers, or any other type and form of information.

A security device 100 may comprise one or more input/output interfaces 166. An input or output interface 166 may comprise any type and form of interface and/or connected peripherals, such as a video interface and display; a parallel or serial interface, such as a universal serial bus (USB) interface and a mouse or keyboard, or an external serial AT attachment (eSATA) interface and one or more external storage devices; or any other type and form of interface.

A security device 100 may comprise one or more memory devices 204. Memory 204 may comprise any type and form of memory or storage, including random access memory (RAM), hard drive storage, solid state drive storage, flash memory, optical or magneto-optical storage, tape storage, or any other type and form of storage device.

In some implementations, a security device 100 may execute an application 208. Application 208 may comprise an applet, server, daemon, service, routine, or other executable log for detecting and analyzing security sensor signals and network packets. In some implementations, application 208 may provide a user interface via a display or other I/O device 166. For example, application 208 may comprise a display of physical security status 225 and/or network security status 230. User interfaces 225, 230 may provide a user or administrator with access to log information, configuration settings, and/or control (e.g. refresh DHCP addresses for devices, add a device to a DMZ or unfiltered zone, quarantine a suspect device, disable or enable monitoring of a security sensor, or any other such controls). In some implementations, application 208 may comprise a web browser, and user interfaces 225 and 230 may comprise web pages maintained by a web server (not illustrated) stored in memory and executed by the security device 100. This may also allow access to user interfaces 225, 230 from computing devices 102 on a local network. In other implementations, application 208 may comprise a standalone application, such as a Java application. In some implementations, application 208 may control other output devices 166, such as LEDs for status lights, speakers, etc.

Application 208 may comprise or communicate with a filter analyzer 214, which may be stored in memory 204 and executed by a processor 202 and/or network interface 150. Filter analyzer 214 may comprise an application, service, server, daemon, routine, or other executable logic for performing queries of a rule set or database of packet filtering rules or sensor signal analysis rules 216, such as generating and executing SQL queries or queries in a similar database language. In some implementations, a relational database of filter rules 216 may comprise one or more actions, conditions, and parameters, such as source IP address ranges and corresponding blocking rules. Parameters may be any type and form of information extracted from packets as discussed above, and/or may include meta-information about a packet or connection, such as a connection latency, error rate, jitter, bandwidth, or other such information. For example, a filter rule may be configured to block packets to a specified destination IP address if a connection to the destination has a latency within a predetermined range. Processing rules define actions to be performed on matching packets, including blocking or discarding the packet, buffering or delaying the packet, forwarding the packet to a specified destination, transmitting the packet to its identified destination address, and/or modifying one or more headers or payloads of the packet.

Filter rules 216 may be any type and form of database, including a flat file, array, relational database, or any other type of data format. In some implementations, rules database 216 may be a SQL database. In some implementations, each rule within filter rules 216 may be indexed or identified by a rule identifier, such as a string, hash value, random number, database or array index. Each rule may comprise one or more actions, one or more conditions, and one or more parameters. In many implementations, a rule may comprise a block or forward rule, indicating, respectively, whether to discard a matching packet or forward the packet to another device. The forwarding rule may indicate to forward the packet to a destination identified in the packet (e.g. in a destination IP address and destination port address respectively in a network and transport layer header of the packet), or may indicate to forward the packet to another device (e.g. a virtual machine for quarantine and/or testing; a processing machine for decryption or decompression; an alternate server for load balancing purposes, etc.). Rules may also include modification actions, such as removing a payload of a packet, replacing a payload with predetermined data or a null data set, modifying a header of the packet, etc. For example, in one implementation, a rule may indicate to modify a DNS query to remove additional data beyond a requested URL to prevent information exfiltration. Conditions may include any type and form of condition, and apply to any portion of a packet including headers or payloads at any layer of the OSI model. Multiple conditions may be applied simultaneously, with any appropriate Boolean operator (e.g. AND, OR, XOR, NOT, etc.). Rules may also include one or more parameters for conditions and/or actions, such as data to match, data to modify, data to replace with other data, etc.

In some implementations, rules may apply to security sensor signals and/or automation device commands or statuses, as well as or instead of network packets. For example, a rule may indicate that a door entry sensor signal should always be accompanied by a door open status from an automated or intelligent door latch, or that a difference in status signals (e.g. [signal 1 XOR signal 2]=true) may indicate an error or intrusion. Actions for such rules may comprise displaying a visual alert, sounding an alarm, sending a predetermined notification or request to a remote computing device (e.g. monitoring service, portable communication device, etc.), or any combination of these or other actions. As discussed above, in some implementations, rules may include conditions and parameters for both network packets, and sensor signals and/or automation device signals. For example, a rule may specify that incoming network packets directed to an automated door latch must be from a specified external address or device (e.g. a resident's smart phone), may not be sent at a rate in excess of a specified amount, and may not have a payload in excess of a predetermined size. Another rule may specify that an alert should be generated responsive to signals from a movement sensor detected after a predetermined time of day, unless a lighting system has been turned on. In many cases, rules may comprise actions to be performed responsive to temporal correlations or lack of correlations between sensor signals and network packets. A temporal correlation between a sensor signal and a network packet may comprise receipt of both the sensor signal and network packet within a predetermined duration. For example, if a door sensor is triggered within 5 seconds of a valid packet being sent to an automated door latch, the system may not generate an alert. Conversely, if a signal from the door sensor is detected and no corresponding status packet has been sent from the door latch or unlock packet sent to the door latch, then the system may generate an alert. Accordingly, in various implementations and for various rules, sensor signals may be expected or not expected responsive to receipt of a network packet, and vice versa. The rules may accordingly specify combinations of such conditions and parameters (e.g. NOT sensor 1 AND packet x WITHIN 5 seconds) and corresponding actions to take.

Rules may be periodically refreshed. For example, in many implementations, a security device 100 may maintain a timer. Upon expiration of the timer (e.g. once per day, once per week, once per two weeks, once per 12 hours, or any other time period), the security device 100 may transmit a request for a refreshed rule set to a management server. The management server may respond with a replacement rule set. In some implementations, to reduce bandwidth, the server may respond with an identification of rules to be removed or replaced from a current rule set. For example, the management server may identify a current rule set for the security device (e.g. via a device identifier of the device stored in association with rules in a database as discussed above, via a stored copy of the rule set, etc.), and may generate a new rule set for the device. The management server may identify a delta or difference between the two rule sets, and may transmit an identification of the difference to the security device (e.g. "delete rule #105; add new rule #202: [actions, conditions, and parameters]; etc."). This may significantly reduce bandwidth requirements, and may help scaling rule distribution to large numbers of security devices.

Device identifier 218 may comprise an alphanumeric string, serial number, MAC address, username or account name, address, GUID, or any other type and form of identifier to distinguish the security device from other security devices. In many implementations, device identifier 218 may be set by a manufacturer, while in other implementations, device identifier 218 may be set by an administrator or user (e.g. user name).

In some implementations, a security device 100 may maintain a log 220. Log 220 may comprise a database, flat file, or other type and form of data structure for recording packet parameters and applied filter actions. In some implementations, security device 100 may record actions with timestamps, device identifiers, or other distinguishing information. Log 220 may be sent to a management server in some implementations to identify attacks or attack attempts, and adjust likelihoods or scores associated with rules.

Figure 2D:
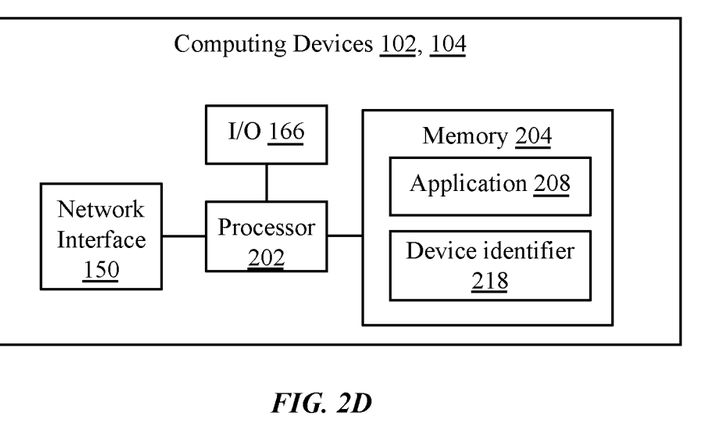
FIGS. 2D-2F are block diagrams of embodiments of computing devices, security sensors, and automation devices, respectively.

FIG. 2D is a block diagram of an embodiment of a computing device 102, 104. Computing devices 102, 104 may comprise laptop computers, desktop computers, portable computers, wearable computers, embedded computers, workstations, servers, appliances, server farms or clouds, smart televisions, video game consoles, network devices, or any other type and form of computing device. In some implementations, a computing device 102, 104 may comprise a physical machine, a virtual machine executed by a physical machine, or a combination of virtual and physical machines. As shown, a computing device may comprise one or more processors 202, memory devices 204, network interfaces 150, and input/output interfaces or devices 166. In some implementations, a computing device 102, 104 may execute an application 208, such as a web browser or other application. A computing device 102, 104 may be identified by a device identifier 218, as discussed above.

Figure 2E:
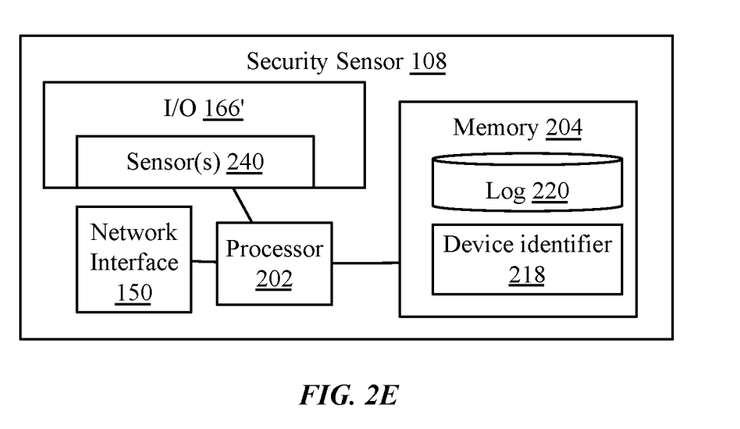

FIG. 2E is a block diagram of an embodiment of a security sensor 108. In some implementations, a security sensor 108 may include one or more of a processor 202, memory 204, network interface 150 (sometimes referred to as a sensor interface), and input/output interfaces or devices 166'. For example, some security sensors 108 may be considered "smart" sensors, and include a computing device to process input signals. In one such implementation, a security sensor 108 may comprise a camera and processor configured to compare sequences of frames of video to detect moving objects. Responsive to detecting a moving object of a specified size or at a specified velocity (measured as a movement distance between frames), the security sensor 108 may send a signal to a security device. In some such implementations, the security sensor 108 may include a log 220, and device identifier 218 for identification purposes when transmitting signals via a network. In other implementations, a sensor may be a "dumb" sensor and not include a processor or memory. For example, in one such implementation, a security sensor 108 may comprise a magnetic switch, for attachment to a door frame or window sill, and activated by a magnet installed on the door or window. Security sensor 108 may include any type and form of sensor 240 or combinations of one or more sensors 240 of the same or different types. A sensor 240 may comprise a magnetic switch as discussed above, an optical switch, a mechanical switch, a capacitive switch, a visible light camera, an infrared camera, a night vision camera, a pressure plate, a vibration detector, a thermocouple, an RF detector (which may include detection of WiFi or Bluetooth signals in a specified area), a fingerprint sensor, a retinal scanner, a barcode scanner, a NFC reader, an accelerometer, a pressure sensor, an anemometer, or any other type and form of sensor. Upon activation, sensor 240 may output, depending on sensor interface and potentially using a network interface 150, a voltage, current, logical 1 or 0, data string, audible signal, visible signal, network packet, or any other type and form of data. In some implementations, a voltage may be present on input terminals of a security sensor 108, and upon activation of sensor 240, the terminals may be shorted or connected together, resulting in a detectable voltage drop at a remote terminal or security device.

Figure 2F:
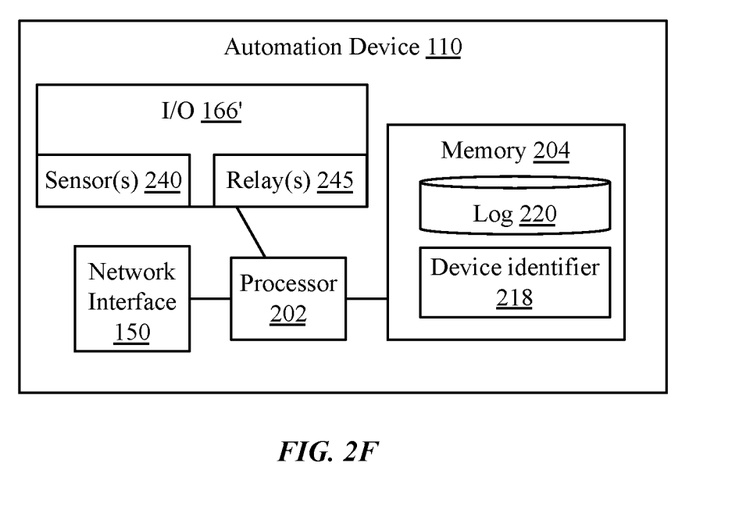

FIG. 2F is a block diagram of an embodiment of an automation device 110. Automation device 110 may comprise an embedded computing device, smart television, appliance, or any other type and form of computing device. Automation device 110 may be part of another device, such as a thermostat, air conditioner, refrigerator, automatic door latch, automated shade, or other such device. Automation device 110 may accordingly comprise a relay, motor, or an interface for controlling relays or motors of other devices (generally referred to as relay(s) 245). In some implementations, an automation device 110 may comprise a plurality of relays 245, for controlling a corresponding plurality of devices or functions. For example, an automation device 110 for a gardening system may comprise a plurality of relays controlling different water pumps.

As shown, an automation device 110 may comprise one or more processors 202, memory devices 204, network interfaces 150, and input/output interfaces or devices 166. An automation device 110 may be identified by a device identifier 218, as discussed above, and may maintain a log 220 of operations performed by the device. In some implementations, an automation device 110 may also include one or more sensors 240, which may be used for detecting statuses of controlled devices (e.g. a voltage sensor 240 or water level sensor 240 connected to a pump controlled by a relay 245). In some implementations, an automation device 110 may also include an input/output device 166', such as a manual control, button, dial, touch screen, status display, or other such interface for a user of the device. As discussed above, in some implementations, an automation device 110 may include one or more network interfaces 150. For example, an automation device 110 may include a Bluetooth interface for communicating with a portable device of a user (e.g. smart phone, proximity sensor, etc.). The automation device 110 may be configured to activate a relay upon detecting and authenticating a signal from a paired device (e.g. an automated door latch). The automation device 110 may also comprise a second network interface, such as a WiFi, Ethernet, or serial interface for communicating status to a security device 100, as discussed above. In some implementations, the same interface may be used to communicate with a security device 100 and detect or communicate with other devices, while in other implementations, different interfaces may be used.

Figure 3:
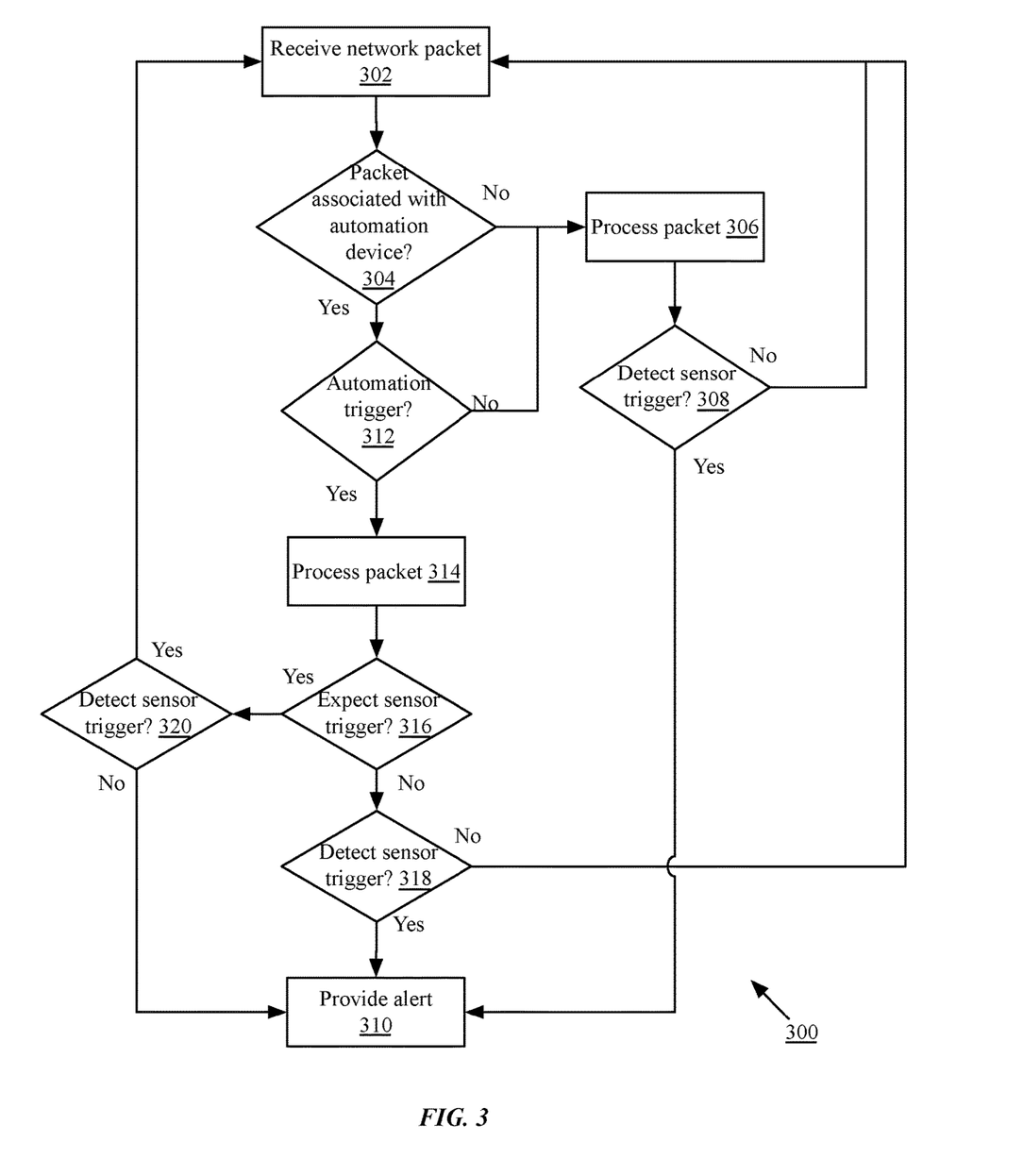
FIG. 3 is a flow chart of an embodiment of a method for correlating physical and network signals.

FIG. 3 is a flow chart of an embodiment of a method 300 for correlating physical security and network signals. Method 300 illustrates one implementation of a security rule that may be applied by a device 100. Other security rules are possible, and accordingly, in other implementations of a method 300, steps 302-320 may be performed in different orders or with additional or different conditions (e.g. based on a packet destination or source address or port, a packet length, a time of day, etc., as discussed above).

At step 302, in one implementation, the security device 100 may receive a network packet. The packet may be received via an external network or internal network. In some implementations, the device may receive a plurality of packets which may comprise fragments of a data object. The device may assemble all or a portion of the plurality of packets in order to process the packets. For example, the device may aggregate and assemble enough of the packets to generate a header, such as a transport layer header, session layer header, or application layer header, and may process the header to determine whether to apply or more filter rules.

At step 304, the security device may determine if the packet is associated with an automation device. For example, the security device may examine a source or destination address of the packet to determine whether it was received from an automation device (such as a status update) or whether it was sent to an automation device (such as a command from another computing device, or an attack attempt). In other implementations, the security device may determine if the packet is associated with an automation device based on a protocol of the packet.

If the packet is not associated with an automation device, then at step 306, the security device may process the packet. Processing the packet may comprise applying network security rules to the packet, including forwarding, blocking, or modifying the packet, as discussed above. Processing the packet may include decrypting or decompressing the packet or a portion of the packet, such as a header or payload. Processing the packet may include transmitting the packet to another computing device for further processing.

At step 308, in some implementations, the security device may determine if a security sensor is triggered within a predetermined time period of receipt of the packet (e.g. 0.1 second, 1 second, 5 seconds, 10 seconds, 30 seconds, or any other such time period). For example, upon receiving and processing a packet identified as not associated with an automation device and processing the packet, the security device may receive a signal from a security sensor on a door indicating that the door has been opened. As the packet is not expected to trigger an automated door latch, the signal may indicate that the packet may have caused another device to generate a second signal to the door latch or disable the latch via a second network interface (e.g. Bluetooth connection directly to the latch, not via the security device). By identifying the unexpected security sensor signal, the security device may be able to detect indirect security attacks. In some implementations, the security device may activate a timer upon receipt of the packet and determine whether the timer has expired without having received a sensor signal. In some implementations, triggering of a sensor may comprise receiving an activation signal or alert signal from a sensor, rather than a normal status signal. In some implementations, if no signal is detected from a security sensor, method 300 may return to step 302.

If a security sensor is activated or triggered within the predetermined time period, in some implementations, at step 310, the security device may provide an alert. Providing an alert may comprise sounding an audible alarm and/or activating a visual alarm. Providing an alert may comprise transmitting a notification via one or more network interfaces to one or more devices (e.g. sending an email to a computing device, sending a text message to a smart phone, sending an alert indication to a monitoring service, etc.). In many implementations, the security device may record to a log an identification of the packet and the sensor signal. The log may be transmitted to a management server or other computing device in some implementations for further review and analysis.

If a packet is determined to be associated with an automation device at step 304, then in some implementations, at step 312, the security device may determine if the packet is an automation trigger. An automation trigger may comprise a command to an automation device to control a relay or motor or other interface, a command to activate another device such as a lighting system, or other such commands. The security device may determine if the packet is an automation trigger by matching the packet to an automation trigger rule. The rule may specify a destination and/or port (e.g. a destination address of the automation device), a packet payload length, a protocol type, or any other such information. In many implementations, packets comprising automation triggers may have a predetermined payload based on the type of automation device (e.g. an HTTP POST or GET request having a predetermined parameter, a remote function call or remote procedure call, XML data such as <relay id="1" status="on">, etc.). Such packet payloads may be compared to a payload template (e.g. via a hash result, a bitwise XOR, etc.), and if the packet payload matches the template, the security device may identify the packet as comprising an automation trigger. In some implementations, payload templates may be preconfigured, such as by an administrator or manufacturer of the security device, or may be downloaded from a management server as part of a rule set. In other implementations, the security device may generate payload templates. For example, upon first receiving a packet directed to an automation device with an unknown payload, the security device may provide an alert or notification to a user or administrator of a potential automation trigger. The user or administrator may indicate that an automation trigger was expected (for example, if they had just activated a control on an automation application executing on a smart phone or other portable device). In response, the security device may generate and/or update a payload template for matching subsequent packets. Accordingly, the security device may learn and generate rules automatically for new automation or IoT devices.

If the packet is not an automation trigger and no automation behavior is expected, then the method may proceed with steps 306 and 308. This may occur, for example, in implementations in which the packet is a status query or configuration update or any other such instance in which it is not expected that a sensor should be activated.

If the packet is an automation trigger, then at step 314, the security device may process the packet. As discussed above, processing the packet may comprise applying one or more rules to the packet and taking corresponding actions, such as blocking, forwarding, or modifying the packet. For example, processing the packet may comprise identifying that the packet payload matches an expected automation trigger for the automation device and forwarding the packet to the automation device. Conversely, processing the packet may comprise identifying that the packet payload purports to be an automation trigger (e.g. via a protocol or other identifier), but contains unexpected data (e.g. potentially malicious executable data, extended data beyond an expected length to trigger a buffer overrun, etc.), and modifying or discarding the packet. In many implementations, steps 312 and 314 may be combined together. For example, in one such implementation, the security device may apply rules to identify the packet as an automation trigger, determine that it has unexpected data, and block the packet.

At step 316, the security device may determine if a security sensor trigger is expected. In many implementations, the expectation of a security sensor trigger may be indicated by a flag or other setting associated with a packet matching rule. For example, a packet may be matched to a rule identifying the packet as an automation trigger for a door latch (e.g. based on destination, payload contents, etc.); the rule may indicate that the packet should be forwarded to the door latch automation device; and the rule may indicate that a sensor trigger should be expected on a door security sensor. In another implementation, the security device may learn that a sensor signal may be expected after an automation trigger and may update a rule accordingly. For example, in some implementations, the security device may not expect a sensor signal after forwarding an automation trigger, and may generate an alert to a user or administrator. The user or administrator may indicate that the behavior is expected, and the security device may update the rule accordingly. Accordingly, the security device may learn and identify expected sensor signals automatically for new automation or IoT devices.

If no sensor trigger is expected, then at step 318, the security device may start a timer having a predetermined duration as discussed above. If the timer expires without detecting a trigger of a corresponding sensor at step 318, then the method may repeat for further packets. If a sensor trigger is detected at step 318, then at step 310, the security device may provide an alert or notification, as discussed above.

Similarly, if a sensor trigger is expected at step 316, then at step 320, the security device may start a timer having a predetermined duration as discussed above. If a sensor trigger is detected at step 320, then the method may repeat for further packets. If the timer expires without detecting a trigger of a corresponding sensor at step 320, then at step 310, the security device may provide an alert or notification, as discussed above.

Accordingly, the systems and methods discussed herein provide for correlation between and control of physical and network security systems. Such systems may be less expensive than separate, non-integrated systems, while providing enhanced security and protection to an environment. In one aspect, the present disclosure is directed to an appliance. The appliance comprises a housing; a physical security device deployed within the housing coupled to one or more security sensors via a sensor interface; and a network security device deployed within the housing coupled to a first network and a second network. The appliance is configured to identify a correlation between a signal of the one or more security sensors and a received network packet.

In some implementations, the appliance includes a display device; and an interface switch, selectively coupling the display device to the physical security device or the network security device. In some implementations, the appliance includes a processor; a memory device; and a network interface. In a further implementation, the physical security device is a virtual physical security device and the network security device is a virtual network security device; and the appliance includes a hypervisor configured to provide shared access, to the virtual physical security device and the virtual network security device, to a common hardware layer comprising the processor, memory device, and network interface. In a still further implementation, the appliance includes a display; and the hypervisor is further configured to provide shared access to the display to the virtual physical security device and the virtual network security device. In another further implementation, the appliance includes a combination security application, executed by the processor, providing the physical security device and the network security device. In a still further implementation, the combination security application comprises a first physical security user interface and a second network security user interface. In an even further implementation, the combination security application comprises a switch to selectively display the first physical security user interface and the second network security user interface.

In some implementations, the sensor interface comprises a general purpose input/output (GPIO) interface, a serial interface, an Ethernet interface, a power line communication (PLC) interface, or a wireless communication interface.

In some implementations, the appliance includes a first network interface coupled to the first network and a second network interface coupled to the second network. In some implementations, the sensor interface comprises a network interface, and the network security device is coupled to the first network via the network interface. In some implementations, the network security device is configured to communicate via the first network to an automation device, the automation device associated with a security sensor of the one or more security sensors. In a further implementation, the appliance is further configured to identify a temporal correlation between a trigger of the security sensor and a received network packet directed to the automation device. In a still further implementation, the appliance is further configured to generate an alert, responsive to the identification of the temporal correlation between the security sensor and the received network packet. In another further implementation, the appliance is further configured to generate an alert, responsive to a lack of temporal correlation between a trigger of the security sensor and a received network packet directed to the automation device.

In another aspect, the present disclosure is directed to a method. The method includes receiving, by a combination physical security and network security appliance, a network packet. The method also includes identifying, by the combination physical security and network security appliance, an automation device as a destination for the network packet. The method also includes determining, by the combination physical security and network security appliance, that the network packet comprises an automation trigger. The method also includes forwarding, by the combination physical security and network security appliance, the network packet to the automation device. The method also includes monitoring, by the combination physical security and network security appliance, an output of a security sensor associated with the automation device, responsive to the determination that the network packet comprises an automation trigger.

In some implementations, the method includes determining, by the combination physical security and network security appliance, that a signal is expected from the security sensor responsive to execution, by the automation device, of the automation trigger. In a further implementation, the method includes generating, by the combination physical security and network security appliance, an alert, responsive to an absence of the signal from the security sensor prior to expiration of a timer.

In some implementations, the method includes determining, by the combination physical security and network security appliance, that a signal is not expected from the security sensor responsive to execution, by the automation device, of the automation trigger. In a further implementation, the method includes generating, by the combination physical security and network security appliance, an alert, responsive to detecting a signal from the security sensor prior to expiration of a timer.

Figure 4:
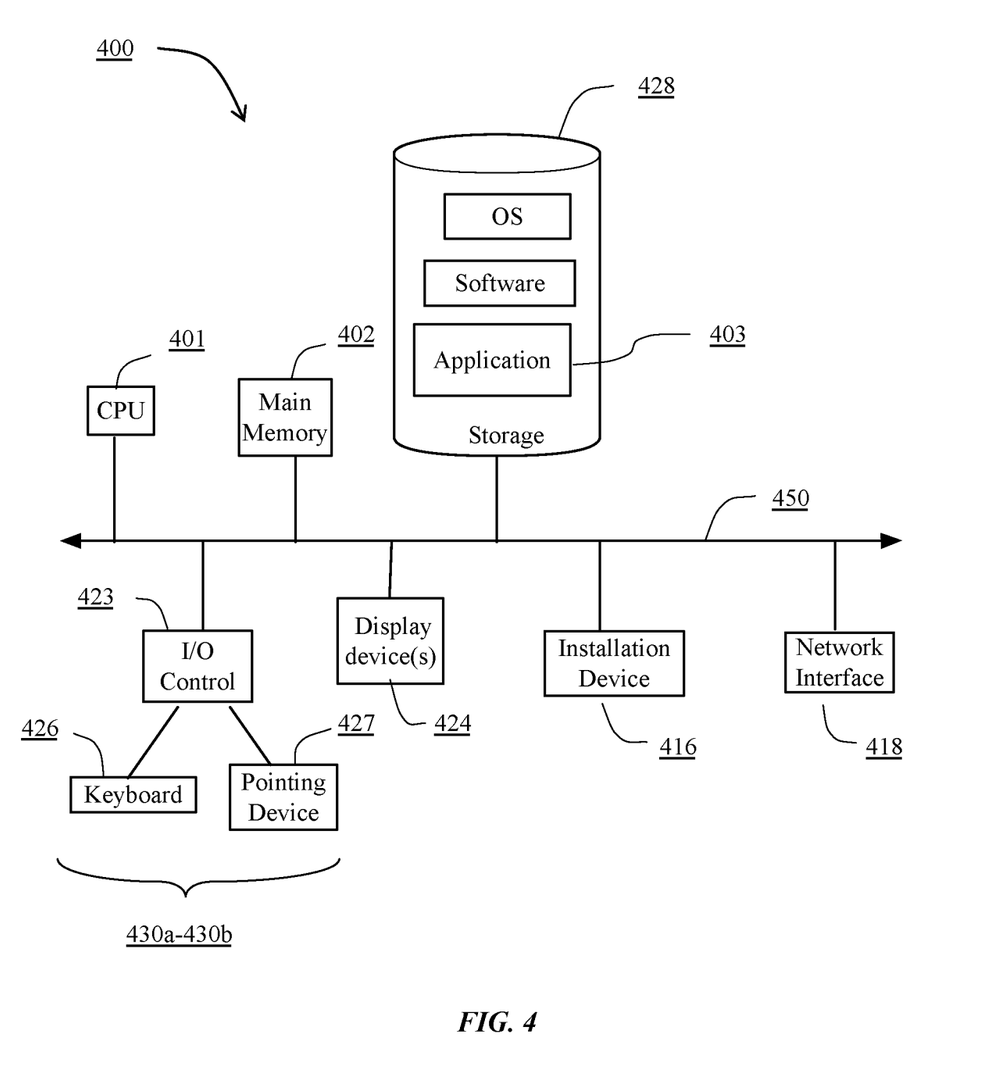
FIG. 4 is a block diagram of an exemplary computing device useful for practicing the methods and systems described herein.

FIG. 4 is a block diagram of an exemplary computing device useful for practicing the methods and systems described herein. The various devices 100, 102, 104, 108, 110 may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet manufactured by Apple Inc. or Android-based tablet such as those manufactured by Samsung, Inc. or Motorola, Inc., smart phone or PDA such as an iPhone-brand/iOS-based smart phone manufactured by Apple Inc., Android-based smart phone such as a Samsung Galaxy or HTC Droid smart phone, or any other type and form of computing device.

FIG. 4 depicts a block diagram of a computing device 400 useful for practicing an embodiment of the security devices and/or client devices discussed above. A computing device 400 may include a central processing unit 401; a main memory unit 402; a visual display device 424; one or more input/output devices 430a-430b (generally referred to using reference numeral 430), such as a keyboard 426, which may be a virtual keyboard or a physical keyboard, and/or a pointing device 427, such as a mouse, touchpad, or capacitive or resistive single- or multi-touch input device; and a cache memory 440 in communication with the central processing unit 401.

The central processing unit 401 is any logic circuitry that responds to and processes instructions fetched from the main memory unit 402 and/or storage 428. The central processing unit may be provided by a microprocessor unit, such as: those manufactured by Intel Corporation of Santa Clara, Calif.; those manufactured by Motorola Corporation of Schaumburg, Ill.; those manufactured by Apple Inc. of Cupertino Calif., or any other single- or multi-core processor, or any other processor capable of operating as described herein, or a combination of two or more single- or multi-core processors. Main memory unit 402 may be one or more memory chips capable of storing data and allowing any storage location to be directly accessed by the microprocessor 401, such as random access memory (RAM) of any type. In some embodiments, main memory unit 402 may include cache memory or other types of memory.

The computing device 400 may support any suitable installation device 416, such as a floppy disk drive, a CD-ROM drive, a CD-R/RW drive, a DVD-ROM drive, tape drives of various formats, USB/Flash devices, a hard-drive or any other device suitable for installing software and programs such as a server or application 403 such as a physical security application, network security application, or combination physical and network security application, or portion thereof. The computing device 400 may further comprise a storage device 428, such as one or more hard disk drives or redundant arrays of independent disks, for storing an operating system and other related software, and for storing application software programs.

Furthermore, the computing device 400 may include a network interface 418 to interface to a Local Area Network (LAN), Wide Area Network (WAN) or the Internet through a variety of connections including, but not limited to, standard telephone lines, LAN or WAN links (e.g., Ethernet, T1, T3, 56 kb, X.25), broadband connections (e.g., ISDN, Frame Relay, ATM), wireless connections, (802.11a/b/g/n/ac, BlueTooth), cellular connections, or some combination of any or all of the above. The network interface 418 may comprise a built-in network adapter, network interface card, PCMCIA network card, card bus network adapter, wireless network adapter, USB network adapter, cellular modem or any other device suitable for interfacing the computing device 400 to any type of network capable of communication and performing the operations described herein.

A wide variety of I/O devices 430a-430n may be present in the computing device 400. Input devices include keyboards, mice, trackpads, trackballs, microphones, drawing tablets, and single- or multi-touch screens. Output devices include video displays, speakers, headphones, inkjet printers, laser printers, and dye-sublimation printers. The I/O devices 430 may be controlled by an I/O controller 423 as shown in FIG. 4. The I/O controller may control one or more I/O devices such as a keyboard 426 and a pointing device 427, e.g., a mouse, optical pen, or multi-touch screen. Furthermore, an I/O device may also provide storage 428 and/or an installation medium 416 for the computing device 400. The computing device 400 may provide USB connections to receive handheld USB storage devices such as the USB Flash Drive line of devices manufactured by Twintech Industry, Inc. of Los Alamitos, Calif.

The computing device 400 may comprise or be connected to multiple display devices 424a-424n, which each may be of the same or different type and/or form. As such, any of the I/O devices 430a-430n and/or the I/O controller 423 may comprise any type and/or form of suitable hardware, software embodied on a tangible medium, or combination of hardware and software to support, enable or provide for the connection and use of multiple display devices 424a-424n by the computing device 400. For example, the computing device 400 may include any type and/or form of video adapter, video card, driver, and/or library to interface, communicate, connect or otherwise use the display devices 424a-424n. A video adapter may comprise multiple connectors to interface to multiple display devices 424a-424n. The computing device 400 may include multiple video adapters, with each video adapter connected to one or more of the display devices 424a-424n. Any portion of the operating system of the computing device 400 may be configured for using multiple displays 424a-424n. Additionally, one or more of the display devices 424a-424n may be provided by one or more other computing devices, such as computing devices 400a and 400b connected to the computing device 400, for example, via a network. These embodiments may include any type of software embodied on a tangible medium designed and constructed to use another computer's display device as a second display device 424a for the computing device 400. One ordinarily skilled in the art will recognize and appreciate the various ways and embodiments that a computing device 400 may be configured to have multiple display devices 424a-424n.

A computing device 400 of the sort depicted in FIG. 4 typically operates under the control of an operating system, such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein.

The computing device 400 may have different processors, operating systems, and input devices consistent with the device. For example, in one embodiment, the computer 400 is an Apple iPhone or Motorola Droid smart phone, or an Apple iPad or Samsung Galaxy Tab tablet computer, incorporating multi-input touch screens. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software embodied on a tangible medium, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, JavaScript, or in any byte code language such as JAVA or WebAssembly. The software programs may be stored on or in one or more articles of manufacture as object code.

What is claimed:

1. A security system, comprising:
a physical security device deployed coupled to one or more physical security sensors via a sensor interface; and
a network security device coupled to a first network and a second network;
wherein the physical security device or the network security device is configured to identify a correlation between a signal of the one or more physical security sensors and a received network packet.

2. The security system of claim 1, further comprising a display device; and an interface switch, selectively coupling the display device to the physical security device or the network security device.

3. The security system of claim 1, wherein at least one of the physical security device and the network security device is a virtual security device, and further comprising:
a processor;
a memory device; and
a network interface; and
a hypervisor configured to provide shared access, to the at least one virtual security device, to a common hardware layer comprising the processor, memory device, and network interface.

4. The security system of claim 3, further comprising a display; and
wherein the hypervisor is further configured to provide shared access to the display to the physical security device and the network security device.

5. The security system of claim 1, further comprising a combination security application, executed by the processor, comprising a first physical security user interface for the physical security device and a second network security user interface for the network security device.

6. The security system of claim 1, wherein the sensor interface comprises a general purpose input/output (GPIO) interface, a serial interface, an Ethernet interface, a power line communication (PLC) interface, or a wireless communication interface.

7. The security system of claim 1, further comprising a first network interface coupled to the first network and a second network interface coupled to the second network.

8. The security system of claim 1, wherein the network security device is configured to communicate via the first network to an automation device, the automation device associated with a physical security sensor of the one or more physical security sensors.

9. The security system of claim 8, wherein the security system is further configured to identify a temporal correlation between a trigger of the physical security sensor and a received network packet, from one of the first network or the second network, associated with the automation device.

10. The security system of claim 9, wherein the security system is further configured to generate an alert, responsive to the identification of the temporal correlation between the trigger of the physical security sensor and the received network packet.

11. The security system of claim 10, wherein the security system is further configured to generate the alert, responsive to the trigger of the physical security sensor being received within a predetermined time period from the received network packet, and the trigger of the physical security sensor not being expected as a result of the received network packet.

12. The security system of claim 8, wherein the security system is further configured to generate an alert, responsive to a lack of temporal correlation between a trigger of the physical security sensor and a received network packet, from one of the first network or the second network, associated with the automation device.

13. The security system of claim 12, wherein the security system is further configured to generate the alert, responsive to a trigger of the physical security sensor not being received within a predetermined time period from the received network packet, the trigger of the physical security sensor being expected as a result of the received network packet.

14. A method, comprising:
receiving, by a combination physical security and network security system, a network packet;
identifying, by the combination physical security and network security system, an automation device as a source or destination of the network packet;
determining, by the combination physical security and network security system, that the network packet comprises an automation trigger;
forwarding, by the combination physical security and network security system, the network packet to the destination of the network packet; and
monitoring, by the combination physical security and network security system, an output of a physical security sensor associated with the automation device, responsive to the determination that the network packet comprises an automation trigger.

15. The method of claim 14, further comprising:
generating, by the combination physical security and network security appliance, an alert, responsive to an absence of the signal from the security sensor prior to expiration of a timer.

16. The method of claim 14, further comprising:
determining, by the combination physical security and network security appliance, that a signal is not expected from the security sensor responsive to execution, by the automation device, of the automation trigger.

17. The method of claim 16, further comprising:
generating, by the combination physical security and network security appliance, an alert, responsive to detecting a signal from the security sensor prior to expiration of a timer.

18. The method of claim 14, wherein the automation device is the source of the network packet and wherein forwarding the network packet to the destination further comprises forwarding the network packet via an external network to the destination.

19. The method of claim 14, wherein the automation device is the destination of the network packet and wherein forwarding the network packet to the destination further comprises forwarding the network packet via an internal network.

20. The method of claim 14, further comprising:
receiving, by the combination physical security and network security system, a second network packet;
identifying, by the combination physical security and network security system, that the automation device is neither a source nor destination of the second network packet; and
generating, by the combination physical security and network security appliance, an alert, responsive to detecting a signal from the physical security sensor associated with the automation device prior to expiration of a timer and responsive to identifying that the automation device is neither the source nor destination of the second network packet.

* * * * *